Dec. 12, 1950     I. JEPSON     2,533,811
JUICE EXTRACTING DEVICE WITH VIBRATING STRAINER
Filed Feb. 1, 1946     2 Sheets-Sheet 1
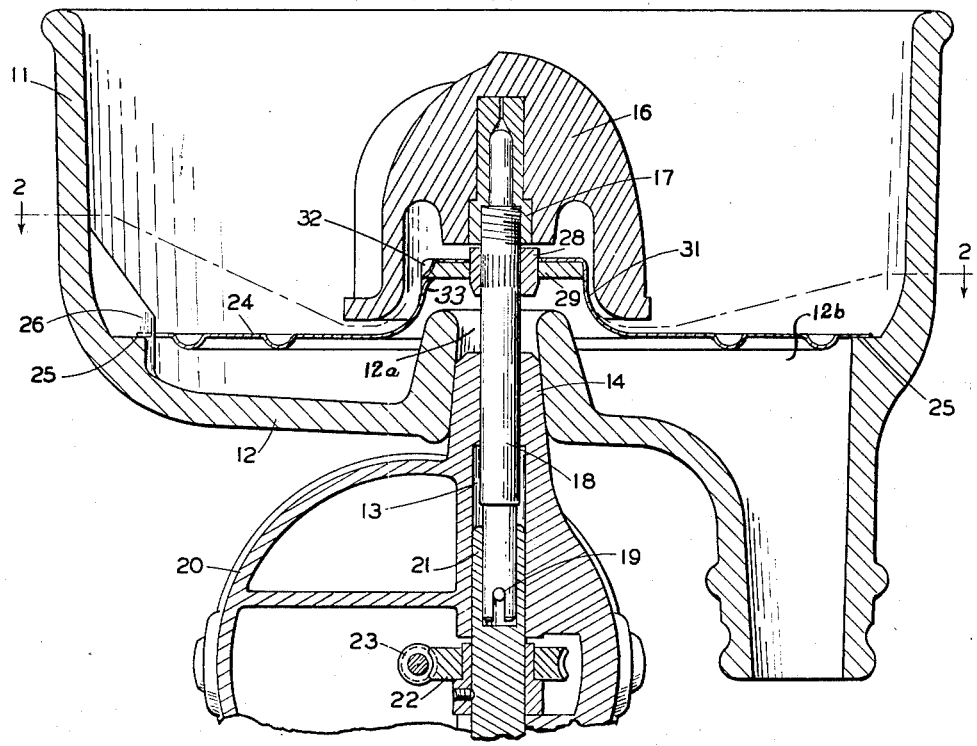
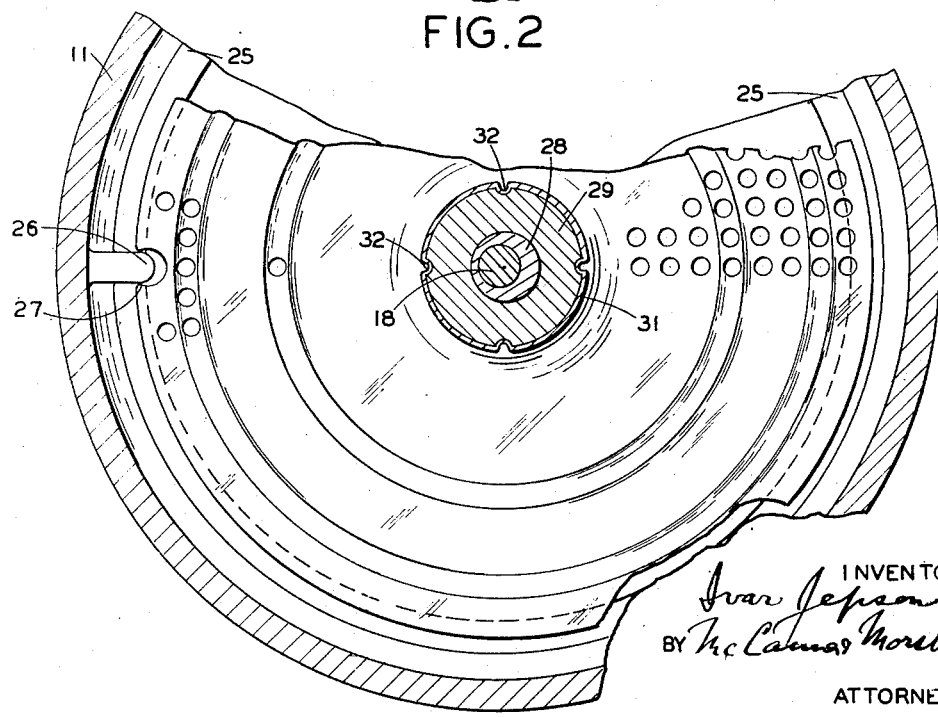

Dec. 12, 1950     I. JEPSON     2,533,811
JUICE EXTRACTING DEVICE WITH VIBRATING STRAINER
Filed Feb. 1, 1946     2 Sheets-Sheet 2
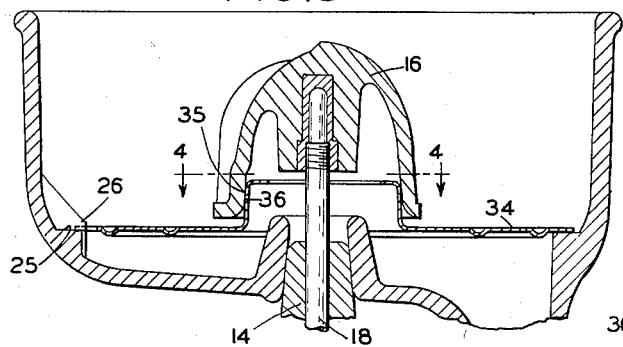
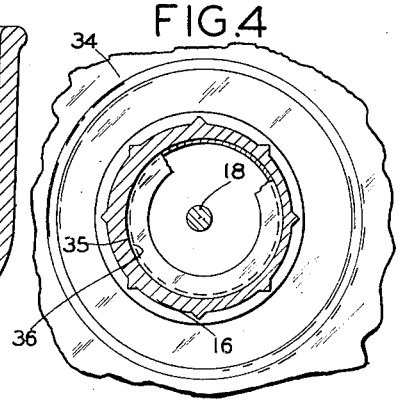
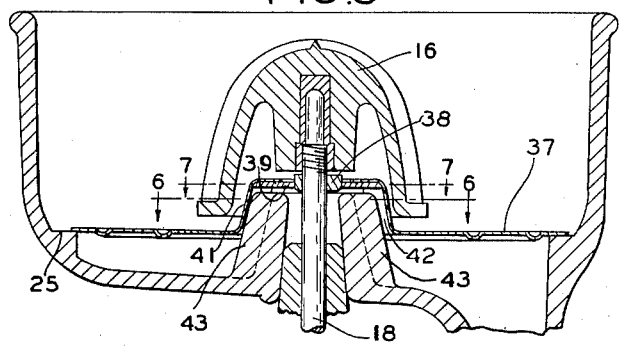
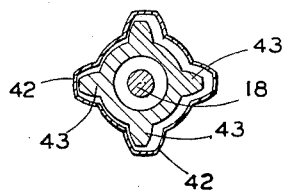
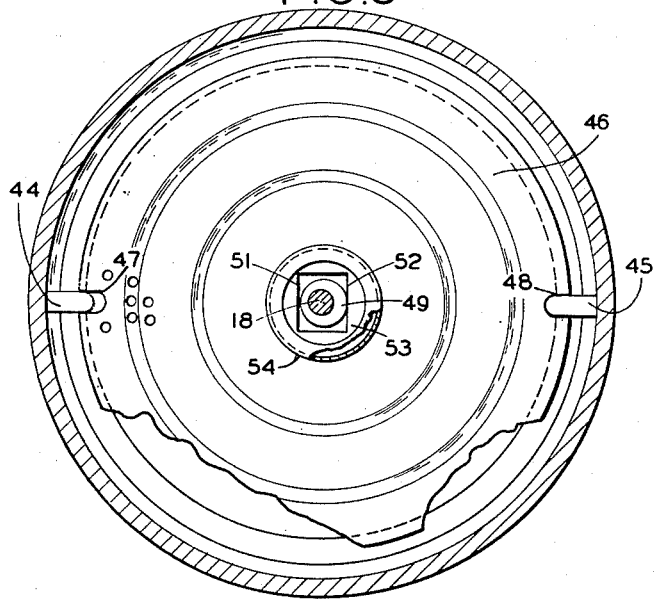
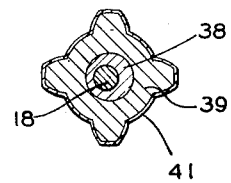
INVENTOR
Ivar Jepson
BY McCanna & Morsbach
ATTORNEYS Patented Dec. 12, 1950

2,533,811

UNITED STATES PATENT OFFICE 2,533,811

JUICE EXTRACTING DEVICE WITH VIBRATING STRAINER

Ivar Jepson, Oak Park, Ill., assignor to Sunbeam Corporation, Chicago, Ill., a corporation of Illinois Application February 1, 1946, Serial No. 644,761

17 Claims. (Cl. 146—3)

This invention relates to devices for extracting juice and pulp from fruits and vegetables.

Heretofore devices of this kind have been provided which are motor operated, but the constructions have been inherently of a complicated nature involving relatively high cost of manufacture.

The present invention aims to improve and simplify devices of this kind by the provision of a novel organization of parts designed to perform the desired juice extracting and straining functions and to permit of manufacture at a low cost.

One of the objects of the invention is to provide a new relationship between the juice bowl, the strainer and the reamer, whereby the strainer is rapidly moved back and forth by direct motion transmitted from the reamer or its spindle shaft, and in which this movement depends on a further connection between the strainer and the bowl. This new relationship provides a simple and practical construction having low cost of manufacture.

Another object of the invention is to provide a juice extractor and strainer of the character described in which the juice extracting and straining parts together with the strainer operating means are disposed entirely within the juice bowl and are easily and conveniently removable for cleaning.

Another object of the invention is to provide an improved juice extractor having a comparatively large juice and pulp capacity without danger of pulp and seeds working down into the bottom of the juice bowl.

Still another object is to provide a combined juice extractor and reamer of the character described, especially adapted for coaction with an electric food mixer of the household type.

Another object is to provide a number of embodiments of the invention, each species having features of construction in common as well as distinguishing from the other.

Other objects and dependent advantages will be appreciated by those skilled in this art as the invention becomes better understood by reference to the following description when considered in connection with the accompanying drawings, in which:

Figure 1 is a vertical section through a combined juice extractor and strainer embodying my invention;

Figure 2 is a fragmentary horizontal section taken substantially on the section line 2—2 of Figure 1;

Figure 3 is a vertical section showing another embodiment of the invention;

Figure 4 is a section taken substantially on the section line 4—4 of Figure 3;

Figure 5 is a vertical section showing a further embodiment of the invention;

Figures 6 and 7 are sections taken substantially on the section lines 6—6 and 7—7, respectively, of Figure 5, omitting the reamer; and Figure 8 is a horizontal section generally similar to Figure 2, but showing still another embodiment of the invention.

In the illustrative embodiments I have shown my invention as applied to a well-known type of juice extracting device characterized by an open-top juice bowl, a rotary reamer or scraper of general cone shape adapted for extracting juice and pulp from citrus fruit, and a strainer located in the bowl to receive the juice and pulp. It has been common to operate devices of this kind by an electric motor connected directly to the reamer shaft or spindle and to mount the strainer so that it is coaxial with the reamer shaft and to provide more or less complicated motion-translating means operated by the motor shaft and functioning to oscillate the strainer upon and coaxially about its center mounting. It has also been known to rotate the strainer with the reamer, but this involves a different method of straining wherein the juice is separated mainly by centrifugal action. This latter method is not satisfactory because of the high speed necessary and because the pulp does not uniformly distribute around the strainer wall and is apt to set up an objectionable vibratory action due to the lack of dynamic balance. Devices of the kind described have also been applied to electric food mixers in which both the reamer spindle or shaft and the strainer are operated through separate drive-transmitting trains from an electric motor or motor-driven means housed or encased as part of the motor unit.

The present invention is illustrated as applied to the motor unit of a food mixer, but it will be understood that the invention may be applied in connection with any suitable support and power drive.

Referring to the embodiment illustrated in Figures 1 and 2, I have shown an open-top juice bowl designated generally by 11, having in its bottom wall 12 a center opening 12a and a drain or downspout opening 12b. In this embodiment the opening 12a is tapered to fit a correspondingly tapered stud 14 integral with a motor casing 20 and serving as a support for the bowl. The reamer 16 may be of any design suitable for extracting juice and pulp from fruits and vegetables. In this embodiment the reamer is of ceramic or plastic material having a metal insert 17 threaded to the upper end of a spindle or drive shaft 18. This reamer spindle extends down into the hollow stud 14 and has a separable connection 19 at its lower end in a drive sleeve or shaft 21 which is journalled in the casing 15. In this instance the sleeve 21 is fixed to a worm gear 22 which is driven by worm 23 which, in turn, is coaxial with the armature shaft of the electric motor and is driven thereby. The drawing shows a well-known type of food mixer motor unit in which the casing 20 is the motor casing and also serves to support the juice bowl.

In the preferred embodiment of my invention a perforated strainer, designated generally by 24, is supported on the juice bowl with its vertical axis parallel with the reamer shaft 18 with capacity for rapid back-and-forth movement in order to perform a shaking and scudding action for straining of the juice from the juice and pulp mixture which is extracted by the reamer or scraper. In this embodiment the side or bottom wall of the juice bowl is provided with a ledge or shelf 25 extending entirely around the inner wall of the bowl so as to provide a continuous seat for the marginal portion of the strainer. Thus the strainer, together with this ledge or shelf and the side wall of the juice bowl, provide a comparatively large-capacity receptacle for catching and retaining the extracted material. The ledge provides a supporting surface on which the strainer is rapidly moved back and forth in a shaking action for the purpose of facilitating separation of the juice from the pulp. It will also be noted that with this construction there is no free space between the periphery of the strainer and the bowl which would permit pulp and seeds to pass down into the bottom of the juice bowl. Also, this construction provides a partition and seal between what may be termed the upper and lower compartments of the juice bowl, so that the only passage between said compartments is through the strainer perforations. The perforations in the strainer may be of any suitable size, shape, and arrangement, according to the nature of the material being separated and other factors such as the rapidity and magnitude of the strainer movement. The straining portion is substantially flat, reinforced by annular ribs and perforated throughout, as shown diagrammatically in Figure 2. In this embodiment the strainer is moved back and forth as in an oscillating movement about the fulcrum 26 formed by a rib extending inwardly from a side wall of the juice bowl. The strainer has a slot or recess 27 in a marginal portion which receives the rib 26 and completes the fulcrum connection.

My invention contemplates the provision of means operating directly between the reamer or the reamer shaft for imparting to the strainer the described back-and-forth movement simultaneously with rotation of the reamer. In the preferred embodiment this is accomplished by an eccentric cam 28 fixed to the reamer spindle shaft 18 at a level above the strainer and within the hollow of the reamer, together with a cam follower 29 fixed to the center of the strainer. I prefer to provide the strainer with a raised central hub portion 31 at a sufficient level to prevent the juice from overflowing at the center or from reaching the cam surfaces. This raised central hub portion 31, as is obvious from the drawings, effectively provides an upwardly extending tubular wall. The cam follower 29 is preferably a graphite-impregnated, laminated, plastic material for the purpose of providing good wearing qualities and long life. The cam follower member 29 may be suitably fixed to the strainer hub as by punching portions 32 into recesses in the member 29 and tabs 33 into retaining engagement beneath said member. It will be apparent that rotation of the reamer causes simultaneous operation of the strainer in a back-and-forth movement, in this instance an oscillating movement about the fulcrum 26 which is located at the outer wall of the juice bowl.

In use of the invention with a food mixer wherein the reamer is driven from a power take-off shaft such as the shaft 21, I prefer to first use the reamer operating at a suitable speed for the juice and pulp extracting function and follow up by operating the strainer at a higher speed for completing the straining function. For example, in the embodiment applied to a food mixer, the motor control speed may be set to rotate the reamer about 370-400 R. P. M. for juicing, and following this the motor speed may be set to the highest which in at least one well-known form of food mixer is 900 R. P. M. and upwards for the reamer, imparting correspondingly rapid movements to the strainer.

In the embodiment shown in Figures 3 and 4, the juice bowl may be the same as in the embodiment Figure 1, and the strainer 34 may be supported on the marginal ledge or shelf 25 so as to oscillate about the fulcrum 26. However, in this embodiment the back-and-forth movement to the strainer is imparted directly by the reamer 16. This is accomplished by forming or otherwise providing on the reamer an annular cam surface 35 eccentric with respect to the reamer spindle shaft 18 and providing a strainer with an upstanding hub portion 36 annular in form so as to coact with the cam surface 35. By reason of this construction the strainer will be oscillated back and forth about the fulcrum 26 when the reamer is rotated, the strainer movement being similar to that in the first described embodiment.

In Figures 5, 6, and 7, I have shown another embodiment of the invention in which the strainer 37 rests marginally on the ledge or shelf 25. An eccentric cam 38 fixed to the reamer spindle shaft 18 coacts with a cam follower 39 suitably fixed to the raised stub portion 41 of the strainer, similar to the first described embodiment. However, in this case the strainer is retained against rotation around the reamer shaft by fulcrum means located at the center of the juicer assembly as distinguished from locating the fulcrum at the marginal portion illustrated in the above described embodiments. In this case the center stub portion 41 of the juice bowl is shaped to provide one or more rib-like portions 43 which coact with correspondingly located socket portions 42 formed in the center hub of the strainer. These coacting rib and socket portions serve to prevent the strainer from rotating in the juice bowl and at the same time permit the strainer to have freedom of motion in response to the action of the rotating cam 38. With this construction the strainer is oscillated in a back-and-forth movement modified by the several fulcrum points provided by the rib and socket construction.

In the further embodiment illustrated in Figure 8, the juice bowl is the same as in Figure 1 except that diametrically opposed fulcrum ribs 44 and 45 are provided at the marginal portion of the bowl and the strainer 46 is provided with corresponding slots or recesses 47 and 48 which coact with the fulcrum ribs 44 and 45, respectively, thus confining the strainer to back-and-forth motion in a rectilinear path. In this case an annular eccentric cam 49, fixed to the reamer shaft 18, coacts with opposed parallel surfaces 51 and 52 of a cam follower 53 which is fixed in the upstanding hub portion 54 of the strainer. It will be evident that upon rotation of the reamer shaft the cam 49 will impart back-and-forth movement to the strainer, the strainer being confined to rectilinear movement by reason of the location of the guide ribs 44—45.

Among the advantages of my invention will be noted:

(1) The comparatively large capacity for juice and pulp collection in the juice bowl as distinguished from prior constructions in which the strainer body alone determines the capacity;

(2) The avoidance of open space between the periphery of the strainer and the surrounding wall of the juice bowl which in prior structures is objectionable because seeds and pulp are apt to be discharged into this space and work back into the juice discharge or be jammed between the strainer wall and the bowl;

(3) The perforated strainer is marginally supported on a ledge extending entirely around the juice bowl, thereby providing a seal between lower and upper compartments in the bowl so that the only passage between said compartments is through the strainer perforations;

(4) The entire reamer operating means is located within the juice bowl;

(5) The elimination of complicated mechanisms operated from points remote from the strainer, this type of construction being inherently costly to manufacture as compared with the few parts and simple construction of the present invention;

(6) Parts are reduced to a juice bowl unit, a reamer and its shaft as one unit, and a strainer unit, it being observed that the novel components which make for the desired operation of the strainer are integral with one or the other of these units;

(7) The ease and facility of assembling and disassembling the parts because of the necessity for frequent washing and cleaning.

It should be apparent from the foregoing that my invention is capable of embodiment in various forms wherever juice and pulp extracting is desired. In other words, while the invention is particularly advantageous in its application to electric food mixers, it is equally well adapted for embodiment with a supporting structure other than the motor unit of a food mixer. Any suitable means may be employed for driving the reamer shaft, as by arranging an electric motor with its armature shaft coaxial with the reamer and providing suitable direct connection therewith. Also, the juice bowl may be removably supported on a suitable base or it may be incorporated integrally with a base housing or casing.

While I have shown several embodiments of my invention, it will be understood that I do not wish to be limited thereto since many modifications may be made, and I therefore contemplate by the appended claims to cover any such modifications as fall within the true spirit and scope of my invention.

I claim:

1. In a citrus fruit juice extractor including pulp and juice separating means comprising, an open top bowl having a juice outlet in its bottom, a perforated strainer substantially covering the bottom of the bowl, the bowl having a supporting ledge extending inwardly from its side wall on which the marginal portion of the strainer is supported, an interfitting connection between a marginal portion of the strainer and the bowl to retain the strainer against rotative movement within the bowl and to permit back-and-forth movement of the strainer with respect to the bowl, a reamer located within the bowl above the strainer, means for rotating the reamer, and means for imparting said back-and-forth movement to the strainer simultaneously with said reamer rotation.

2. In a fruit juice extractor including pulp and juice separating means comprising, an open top bowl having a juice outlet in its bottom, a perforated strainer substantially covering the bottom of the bowl, means coacting directly between the bowl and a marginal portion of the strainer to retain the strainer against rotative movement within the bowl and to permit back-and-forth movement of the strainer with respect to the bowl, a reamer located within the bowl above the strainer, means for rotating the reamer, and means for imparting said back-and-forth movement to the strainer simultaneously with said reamer rotation.

3. A citrus fruit juice extractor including means for separating the juice from the pulp comprising, in combination, a juice bowl having a bottom opening, a reamer located in the bowl, a shaft extending through said bottom opening in the juice bowl and connected to the reamer for rotating it, a perforated juice strainer in the bowl beneath the reamer, and a cam rotatable with said reamer coacting directly with the strainer to impart back-and-forth movements thereto upon rotation of the reamer shaft.

4. A citrus fruit juice extractor including means for separating the juice from the pulp comprising, in combination, an open top bowl having in its bottom wall a center opening and a juice outlet opening, a reamer located in the bowl having a drive shaft extending through said center opening, a perforated juice strainer supported in the bowl beneath the reamer, a cam on the reamer shaft above the center portion of the bowl coacting directly with the strainer to impart back-and-forth movements thereto upon rotation of the reamer shaft, and means coacting between the bowl and the strainer to maintain the strainer against rotation with respect to the reamer during said back-and-forth movement of the strainer.

5. A citrus fruit juice extractor comprising, in combination, a juice bowl, a reamer, a rotatable member serving to support the reamer in the juice bowl and to rotate the reamer, a strainer, means supporting the strainer in the juice bowl with capacity for bodily movement of the strainer back and forth in a path of movement transverse with respect to the rotatable member and non-concentric therewith, and a cam on the reamer eccentric with respect to the rotatable member and coacting directly with said strainer for imparting to the strainer said back-and-forth movement.

6. A citrus fruit juice extractor comprising, in combination, a juice bowl, a reamer having a spindle shaft fixed thereto, the spindle shaft serving to support the reamer in the juice bowl and to rotate the reamer, a strainer, means supporting the strainer in the juice bowl with capacity for bodily movement of the strainer back and forth in a path of movement transverse with respect to the spindle shaft and non-concentric therewith, one or more guide ribs on the juice bowl at the center portion thereof, one or more guide sockets on the strainer coacting with said guide rib or ribs, and eccentric means on the spindle shaft coacting with the strainer for imparting to the strainer said back-and-forth movement.

7. A citrus fruit juice extractor comprising, in combination, a juice bowl, a reamer having a spindle shaft fixed thereto, the spindle shaft serving to support the reamer in the juice bowl and to rotate the reamer, a strainer, means supporting the strainer in the juice bowl with capacity for bodily movement of the strainer back and forth in a path of movement transverse with respect to the spindle shaft, diametrically opposite guides on the juice bowl coacting with the strainer to confine it to said movement, and means operated by rotation of the spindle shaft for imparting to the strainer said back-and-forth movement.

8. In a citrus fruit juice extractor including pulp and juice separating means comprising, a juice bowl, a perforated strainer, the bowl having a supporting ledge extending inwardly from its side wall entirely around said wall, said strainer seating marginally on said ledge to seal the upper compartment of the bowl from the lower compartment thereof so that the only passage from the upper compartment to the lower compartment is through the strainer perforations, means to restrain the strainer against rotative movement within the bowl and to permit back-and-forth movement of the strainer on said marginal supporting ledge, a reamer located within the bowl above the strainer, means for rotating the reamer, and means for imparting to the strainer said back-and-forth movement.

9. In a citrus fruit juice extractor including pulp and juice separating means comprising, a juice bowl, a perforated strainer, the bowl having a supporting ledge extending inwardly from its side wall entirely around said wall, said strainer seating marginally on said ledge to seal the upper compartment of the bowl from the lower compartment thereof so that the only passage from the upper compartment to the lower compartment is through the strainer perforations, means defining a slot in a marginal portion of said strainer, a rib on the inner wall of the bowl engaging said slot to restrain the strainer against rotative movement within the bowl and to permit back-and-forth movement of the strainer on said marginal supporting ledge, a reamer located within the bowl above the strainer, means for rotating the reamer, and means for imparting to the strainer said back-and-forth movement.

10. A citrus fruit juice extractor comprising, in combination a juice bowl, reamer means, rotatable vertical shaft means extending into said bowl for supporting said reamer and imparting rotary movement thereto, a strainer, means on said bowl for supporting said strainer within said bowl with the vertical axis of said strainer parallel with said shaft means, and a strainer moving mechanism supported on one of said first two means and engageable with said strainer for moving the vertical axis of said strainer transversely relative to said shaft means.

11. A citrus fruit juice extractor comprising, in combination, a juice bowl, a reamer, a rotatable vertical shaft extending into said bowl for supporting said reamer and imparting rotary movement thereto, a strainer, means for supporting said strainer in said bowl with the vertical axis of said strainer parallel with said shaft, rotation preventing means for preventing rotative movement of said strainer about said vertical axis, and strainer moving means rotatable with said reamer and directly engageable with said strainer for moving the vertical axis of said strainer transversely relative to said shaft.

12. A citrus fruit juice extractor comprising, in combination, a juice bowl, a reamer, a rotatable vertical shaft extending into said bowl for supporting said reamer and imparting rotary movement thereto, a strainer, means for supporting said strainer in said bowl with the vertical axis of said strainer parallel with said shaft, cooperating means on said bowl and strainer for preventing rotative movement of said strainer about said vertical axis, and strainer moving means rotatable with said reamer and effectively engageable with said strainer for moving the vertical axis of said strainer transversely relative to said shaft.

13. A citrus fruit juice extractor comprising, in combination, a juice bowl, a reamer, a rotatable vertical shaft extending into said bowl for supporting said reamer and imparting rotary movement thereto, a perforated strainer, means including an integral part of said bowl for supporting said strainer in said bowl in an operative position beneath said reamer with the vertical axis of said strainer parallel with said shaft, and means completely located within said bowl and rotatable with said reamer for moving the vertical axis of said strainer transversely relative to said shaft.

14. A citrus fruit juice extractor comprising, in combination, a juice bowl, a reamer, a rotatable vertical shaft extending into said bowl for supporting said reamer and imparting rotary movement thereto, a strainer having a centrally disposed upwardly extending tubular wall, means for supporting said strainer in said bowl with the vertical axis of said strainer parallel with said shaft, and cam means rotatable with said shaft engageable with said tubular wall for moving the vertical axis of said strainer transversely relative to said shaft in response to rotation of said shaft.

15. In a citrus fruit juice extractor of the type having a juice bowl and reamer disposed in said bowl including a rotary shaft extending into said bowl for supporting said reamer and imparting rotary motion thereto, means defining an annular ledge in said bowl, a strainer having a centrally disposed upwardly extending tubular wall peripherally supported on said ledge, said strainer and a portion of said bowl above said ledge defining a pulp retaining chamber, cooperating means on said bowl and strainer for limiting movement of said strainer relative to said bowl and providing a fulcrum or pivot point for said strainer adjacent its periphery, and means on said shaft within said bowl for imparting pivotal motion about said fulcrum on the periphery of said strainer to said strainer in response to rotation of said shaft.

16. In a citrus fruit juice extractor of the type having a juice bowl and reamer disposed in said bowl including a rotary shaft extending into said bowl for supporting said reamer and imparting rotary motion thereto, a strainer supported in said bowl above the bottom thereof with its vertical axis in generally coaxial relationship with said shaft, means comprising both said strainer and a portion of said bowl defining a pulp retaining chamber, strainer rotation preventing means comprising cooperating means on said bowl and strainer for preventing rotative movement of said strainer about said axis, and means on said shaft within said bowl for imparting oscillatory motion to said strainer in response to rotation of said shaft such that said axis moves into and out of coaxial relationship with said shaft.

17. In a citrus fruit juice extractor of the type having a juice bowl and reamer disposed in said bowl including a rotary shaft extending into said bowl for supporting said reamer and imparting rotary motion thereto, a strainer supported in said bowl above the bottom thereof with its vertical axis in generally coaxial relationship with said shaft, and means on said shaft within said bowl for imparting oscillatory motion to said strainer in response to rotation of said shaft such that said axis moves into and out of coaxial relationship with said shaft.

IVAR JEPSON.

REFERENCES CITED

The following references are of record in the file of this patent:

UNITED STATES PATENTS

| Number | Name | Date |
| --- | --- | --- |
| 113,443 | Myers | Apr. 4, 1871 |
| 1,894,858 | Fromm | Jan. 17, 1933 |
| 2,160,388 | Morse | May 30, 1939 |
| 2,249,817 | Fromm | July 22, 1941 |
| 2,343,327 | Reynolds | Mar. 7, 1944 |